(12) United States Patent
Iriyama (10) Patent No.: US 8,938,351 B2
(45) Date of Patent: Jan. 20, 2015

(54) OUTPUT CONTROL DEVICE FOR INTERNAL COMBUSTION ENGINE AND OUTPUT CONTROL METHOD FOR INTERNAL COMBUSTION ENGINE

(75) Inventor: Masahiro Iriyama, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 304 days.

(21) Appl. No.: 13/640,960

(22) PCT Filed: Apr. 12, 2011

(86) PCT No.: PCT/JP2011/059085
§ 371 (c)(1),
(2), (4) Date: Oct. 12, 2012

(87) PCT Pub. No.: WO2011/129328
PCT Pub. Date: Oct. 20, 2011

(65) Prior Publication Data
US 2013/0035844 A1  Feb. 7, 2013

(30) Foreign Application Priority Data

Apr. 13, 2010  (JP) ............................ P2010-092177

(51) Int. Cl.
*G06F 19/00* (2011.01)
*F02D 29/02* (2006.01)
(Continued)

(52) U.S. Cl.
CPC .............. *F02D 29/02* (2013.01); *B60T 7/042* (2013.01); *F02D 41/12* (2013.01); *F02D 11/105* (2013.01); *B60W 50/10* (2013.01); *F02M 35/10229* (2013.01); *B60T 2260/08* (2013.01); *B60T 2270/413* (2013.01); *F02D 2200/602* (2013.01); *F02D 2250/26* (2013.01);
(Continued)

(58) Field of Classification Search
USPC ......................... 701/110, 102, 115; 477/3, 15
See application file for complete search history.

(56) References Cited

U.S. PATENT DOCUMENTS 6,125,315 A  9/2000  Kon et al.
6,463,896 B1 *  10/2002  Fujiwara et al. ........... 123/90.11
(Continued)

FOREIGN PATENT DOCUMENTS

JP  7-139383 A  5/1995
JP  11-050875 A  2/1999
(Continued)

OTHER PUBLICATIONS

U.S. Appl. No. 13/640,956, filed Oct. 23, 2012, Iriyama.
(Continued)

*Primary Examiner* — Hieu T Vo
(74) *Attorney, Agent, or Firm* — Foley & Lardner LLP (57) ABSTRACT

The present invention concerns an output control device for an internal combustion engine for generating a drive force of a vehicle. The output control device includes a braking request detection sensor for detecting whether or not a braking request operation has been performed, and a controller programmed to limit an output of the internal combustion engine when the braking request operation is started, completely lift output limitation of the internal combustion engine over a predetermined limitation lifting time when the braking request operation is finished and shorten the limitation lifting time when a predetermined condition holds.

5 Claims, 8 Drawing Sheets

(51) Int. Cl.
  *B60T 7/04* (2006.01)
  *F02D 41/12* (2006.01)
  *F02D 11/10* (2006.01)
  *B60W 50/10* (2012.01)
  *B60W 20/00* (2006.01)
  *F02D 29/00* (2006.01)
  *F02M 35/10* (2006.01)
  *B60W 10/06* (2006.01)

(52) U.S. Cl.
  CPC ........... *B60W 10/06* (2013.01); *B60W 2540/10* (2013.01); *B60W 2540/12* (2013.01); *B60W 2710/0605* (2013.01)
  USPC .............................................. 701/110; 477/3

(56) References Cited

U.S. PATENT DOCUMENTS

| | | | |
|---|---|---|---|
| 7,381,146 B2 * | 6/2008 | Gouda et al. ...................... 477/3 |
| 8,392,052 B2 * | 3/2013 | Takeda ......................... 701/29.1 |
| 2007/0150118 A1 | 6/2007 | Takamatsu et al. |
| 2007/0169007 A1 | 7/2007 | Hashimoto et al. |
| 2010/0036566 A1 | 2/2010 | Hayami |

FOREIGN PATENT DOCUMENTS

| | | |
|---|---|---|
| JP | 11-148396 A | 6/1999 |
| JP | 11-148407 A | 6/1999 |
| JP | 11-182274 A | 7/1999 |
| JP | 2005-291030 A | 10/2005 |
| JP | 2009-250071 A | 10/2009 |
| JP | 2010-038051 A | 2/2010 |
| RU | 2 329 170 C2 | 7/2008 |
| RU | 2 338 653 C2 | 11/2008 |

OTHER PUBLICATIONS

Russian Decision on Grant dated Apr. 1, 2014 (9 pgs.).

* cited by examiner

OUTPUT CONTROL DEVICE FOR INTERNAL COMBUSTION ENGINE AND OUTPUT CONTROL METHOD FOR INTERNAL COMBUSTION ENGINE

FIELD OF THE INVENTION

The present invention relates to an output control device for an internal combustion engine and an output control method for an internal combustion engine.

BACKGROUND

Even if there is a certain trouble with an accelerator pedal, e.g. if a driver lays down a floor mat anew and the accelerator pedal should be caught by the newly laid floor mat and cannot be returned from a depressed state, a vehicle is required to be able to be stopped if a brake pedal is depressed.

Thus, JPH 11-182274A discloses to limit an opening of a throttle valve (hereinafter, referred to as a "throttle opening") to a predetermined opening if a brake pedal is depressed when a vehicle speed is lower than a predetermined vehicle speed and an accelerator pedal is depressed by a predetermined amount or more. It is also disclosed that, when the brake pedal is released, limitation on the throttle opening is gradually lifted over a predetermined time and a sudden start of a vehicle is prevented.

SUMMARY

When driving a vehicle, a driver generally depresses an accelerator pedal and a brake pedal with the right foot. Some drivers may depress the brake pedal with the left foot while depressing the accelerator pedal with the right foot depending on the situation.

Thus, if the limitation is constantly lifted over the predetermined time after the throttle opening is limited as disclosed in JPH11-182274A, there has been a problem that the throttle opening is limited in some cases although a driver is requesting a drive force, thereby causing an acceleration failure and deteriorating driving performance.

The present invention was developed in view of such a problem and an object thereof is to enable a vehicle to be stopped through the depression of a brake pedal when there is a trouble with an accelerator pedal by any chance and suppress the deterioration of driving performance.

To achieve the above object, the present invention is directed to an output control device for an internal combustion engine for generating a drive force of a vehicle, including a braking request detection sensor for detecting whether or not a braking request operation has been performed; and a controller programmed to limit an output of the internal combustion engine when the braking request operation is started, completely lift output limitation of the internal combustion engine over a predetermined limitation lifting time when the braking request operation is finished and shorten the limitation lifting time when a predetermined condition holds.

Embodiments and advantages of the present invention are described in detail below with reference to the accompanying drawings.

DETAILED DESCRIPTION

Hereinafter, one embodiment of the present invention is described with reference to the drawings and the like.
(First Embodiment)

Figure 1:
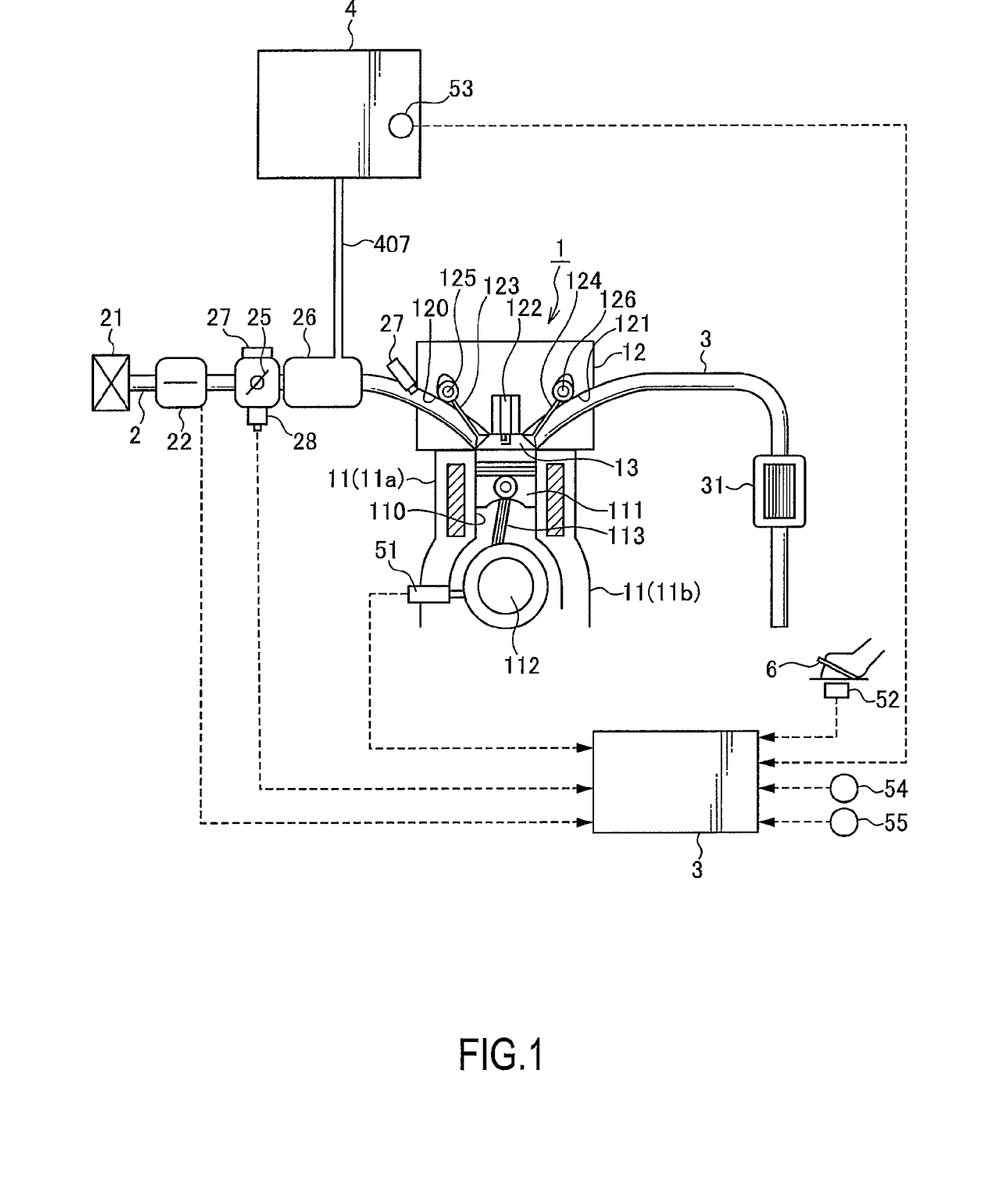
FIG. 1 is a schematic configuration diagram of a control device for a vehicle according to a first embodiment of the present invention.

FIG. 1 is a schematic configuration diagram of a control device for a vehicle according to a first embodiment of the present invention.

The control device for the vehicle includes an engine 1 which generates a drive force of the vehicle, an intake passage 2 in which air to be sucked into the engine 1 (hereinafter, referred to as "intake air") flows, an exhaust passage 3 in which combustion gas exhausted from the engine 1 (hereinafter, referred to as "exhaust air") flows, a braking device 4 which brakes the vehicle and a controller 5.

The engine 1 includes a cylinder block 11 and a cylinder head 12.

The cylinder block 11 includes a cylinder part 11a and a crank case part 11b.

A plurality of cylinders 110 are formed in the cylinder part 11a. A piston 111 which reciprocatingly moves in the cylinder 110 upon receiving a combustion pressure is housed in each cylinder 110.

The crank case part 11b is formed below the cylinder part 11a. The crank case part 11b rotatably supports a crankshaft 112. The crankshaft 112 translates reciprocating motions of the pistons 111 into a rotational motion via a conrod 113.

The cylinder head 12 is mounted on the upper surface of the cylinder block 11 and forms a part of a combustion chamber 13 together with the cylinders 110 and the pistons 111.

The cylinder head 12 is formed with intake ports 120 which are connected to the intake passage 2 and open in the top wall of the combustion chamber 13 and exhaust ports 121 which are connected to the exhaust passage 3 and open in the top wall of the combustion chamber 13, and ignition plugs 122 are provided to be located in the center of the top wall of the combustion chamber 13. Further, the cylinder head 12 includes intake valves 123 which open and close openings between the combustion chamber 13 and the intake ports 120 and exhaust valves 124 which open and close openings between the combustion chamber 13 and the exhaust ports 121. Furthermore, the cylinder head 12 includes an intake camshaft 125 for drivingly opening and closing the intake valves 123 and an exhaust camshaft 126 for drivingly opening and closing the exhaust valves 124.

An air cleaner 21, an air flow meter 22, an electronically controlled throttle valve 25, an intake air collector 26 and fuel injection valves 27 are provided in this order from an upstream side in the intake passage 2.

The air cleaner 21 removes foreign substances such as sand included in the intake air.

The air flow meter 22 detects the flow rate of the intake air (hereinafter, referred to as an "intake air amount").

The throttle valve 25 adjusts the amount of the intake air flowing into the intake air collector 26 by changing a passage cross-sectional area of the intake passage 2. The throttle valve 25 is drivingly opened and closed by a throttle actuator 27 and an opening thereof (hereinafter, referred to as a "throttle opening") is detected by a throttle sensor 28.

The intake air collector 26 equally distributes the flowed-in air to each cylinder 110.

The fuel injection valve 27 injects fuel toward the intake port 120 according to an operating state of the engine 1.

A three-way catalyst 31 for removing toxic substances such as hydrocarbons and nitrogen oxides in the exhaust air is provided in the exhaust passage 3.

The braking device 4 is a device for generating a braking force necessary to decelerator or stop the vehicle. The braking device 4 is described with reference to FIG. 2.

Figure 2:
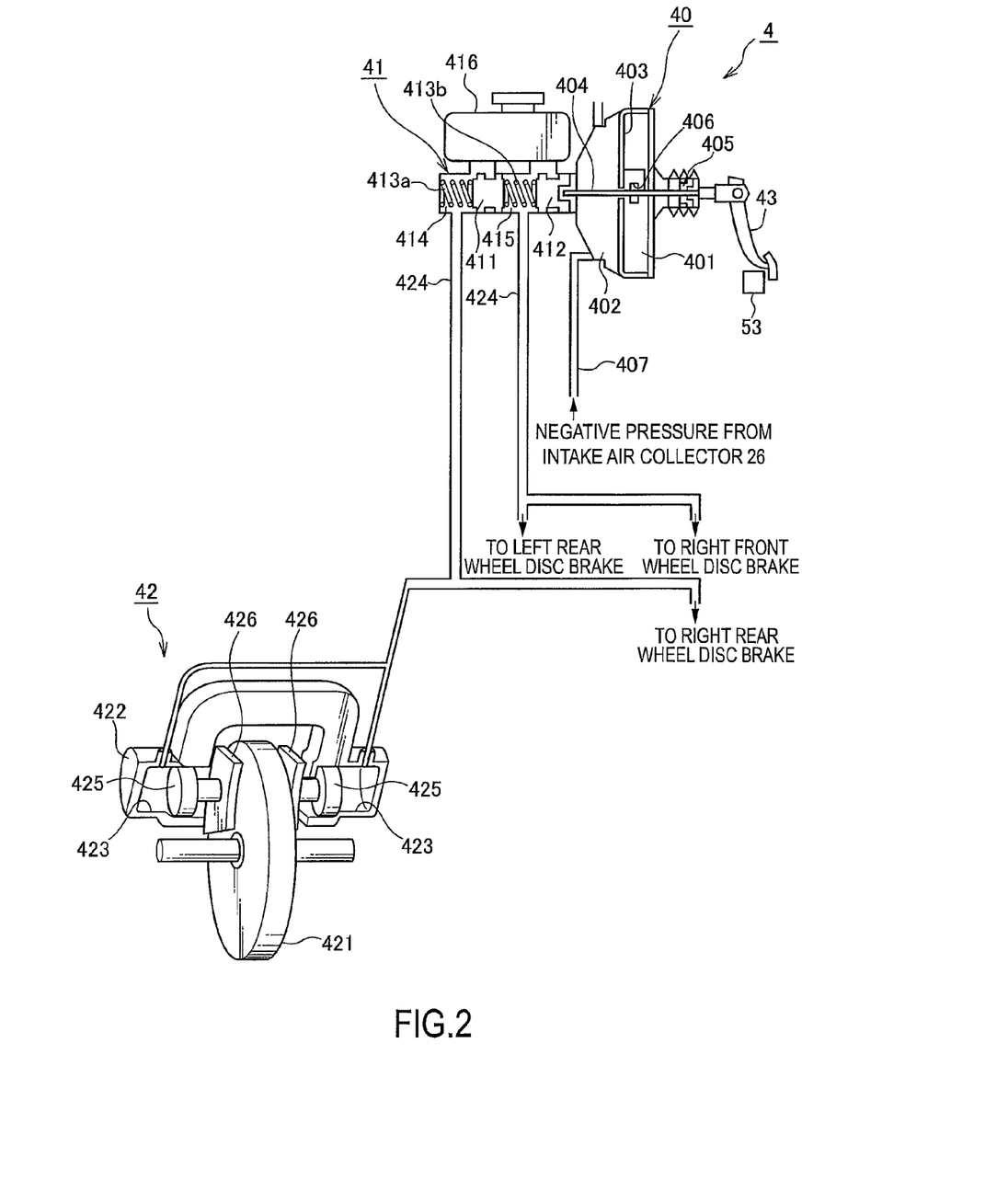
FIG. 2 is a schematic configuration diagram of a braking device according to the first embodiment of the present invention.

FIG. 2 is a schematic configuration diagram of the braking device 4.

The braking device 4 includes a brake booster 40, a master cylinder 41, disc brakes 42 and a brake pedal 43.

The brake booster 40 is internally provided with a first chamber 401 and a second chamber 402 partitioned by a diaphragm 403 and a push rod 404, and reduces a force necessary to operate the brake pedal 43 utilizing a sucked negative pressure of the engine 1.

The first chamber 401 communicates with the atmosphere via a breather valve 405. The second chamber 402 communicates with the intake air collector 26 via a negative pressure pipe 407 and is in a negative pressure state. The first chamber 401 and the second chamber 402 communicate via a vacuum valve 406.

The push rod 404 penetrates through the interior of the brake booster 40. One end of the push rod 404 is connected to a second piston 412 of the master cylinder 41 and the other end is connected to the brake pedal 43. The push rod 404 moves to the left in FIG. 2 when the brake pedal 43 is depressed. This opens and closes the breather valve 405 and the vacuum valve 406 and a first piston 411 and the second piston 412 of the master cylinder 41 are pushed against return springs 413a, 413b, thereby generating a hydraulic pressure.

The master cylinder 41 includes the first and second pistons 411, 412 inside and generates a hydraulic pressure for operating the disc brakes 42.

The first piston 411 is supported from opposite sides by the return springs 413a, 413b. Parts where the return springs 413a, 413b are housed respectively form a first pressure chamber 414 and a second pressure chamber 415.

Each of the first pressure chamber 414 and the second pressure chamber 415 includes a supply port and a pressure feed port for brake fluid. The supply port communicates with a reservoir tank 416 to which the brake fluid is supplied. The pressure feed port communicates with a caliper 422 of the disc brake 42 for braking each wheel via a hydraulic pipe 424a, 424b. Only the disc brake 42 for braking the left front wheel is shown in FIG. 2 to avoid cumbersomeness.

The disc brake 42 includes a disc-shaped disc rotor 421 which rotates together with a rotary axis of the wheel, and the caliper 422 provided to sandwich the disc rotor 421.

Two cylinders 423 are provided at the opposite sides of the disc rotor 421 to face each other in the caliper 422. The cylinders 423 communicate with the master cylinder 41 via the hydraulic pipe 424. Further, pistons 425 which move in parallel to the rotary shaft of the wheel are housed in the cylinders 423, and brake pads 426 as friction members are provided at disc-rotor side ends of the pistons 425.

Next, functions of the braking device 42 are described.

The breather valve 405 of the brake booster 40 is closed when the brake pedal 43 is not depressed. On the other hand, the vacuum valve 406 is open. Accordingly, when the brake pedal 43 is not depressed, the first and second chambers 401, 402 are in a communicating state and pressures in the both are the same negative pressure.

When the brake pedal 43 is depressed in this state, the push rod 404 moves to the left in FIG. 2 and the vacuum valve 406 is first closed. This causes the first and second chambers 401, 402 not to communicate with each other.

When the brake pedal 43 is further depressed, the breather valve 405 is opened and atmospheric air is introduced into the first chamber 401. This causes the pressure in the first chamber 401 to be set at an atmospheric pressure. On the other hand, the pressure in the second chamber 402 remains to be the same negative pressure as that before the brake pedal 43 is depressed. Thus, there is a pressure difference between the first chamber 401 and the second chamber 402, and this differential pressure acts on the diaphragm 403 to serve as an assisting force in moving the push rod 404.

Further, when the brake pedal 43 is depressed, the push rod 404 moves to the left in FIG. 2 and the first and second pistons 411, 412 of the master cylinder 41 are pushed to the left in FIG. 2 against the return springs 413a, 413b to generate a hydraulic pressure. This hydraulic pressure acts on the pistons 425 of the calipers 422 via the hydraulic pipes 424a, 424b from the pressure feed port, whereby the pistons 425 move toward the disc rotors. This causes the brake pads 426 to be pressed against the disc rotors 421, thereby generating a braking force necessary to decelerate or stop the vehicle.

Description is further made with reference back to FIG. 1.

The controller 5 is configured by a microcomputer including a central processing unit (CPU), a read only memory (ROM), a random access memory (RAM) and an input/output interface (I/O interface).

To the controller 5 are input detection signals from various sensors such as an engine rotation speed sensor 51 for detecting an engine rotation speed based on a crank angle, an accelerator stroke sensor 52 for detecting a depressed amount of the accelerator pedal 6 (hereinafter, referred to as an "accelerator operation amount"), a brake switch 53 for detecting whether or not the brake pedal 43 is depressed, a shift position detection sensor 54 for detecting the position of a shift lever and a vehicle speed sensor 55 for detecting a vehicle speed in addition to detection signals from the air flow meter 22 and the throttle sensor 28 described above.

The controller 5 optimally controls a throttle opening, a fuel injection amount, an ignition timing and the like according to an operating state based on the detection signals from these various sensors. Further, the controller 5 carries out various fail-safes to ensure the safety of a driver as needed.

One of these fail-safes is, for example, to enable the vehicle to reliably decelerate and stop if the brake pedal 43 is depressed even if a driver lays down a floor mat anew and the accelerator pedal 6 should be caught by the newly laid floor mat and cannot be returned from a depressed state. This is specifically to limit an engine torque (throttle opening) lest a drive force of the vehicle should become larger than a braking force when the accelerator pedal 6 and the brake pedal 43 are both depressed.

Here, if the limitation of the engine torque is completely lifted at the same time as the brake pedal 43 is released, the engine torque may suddenly increase to cause a torque shock and driving performance may be deteriorated. To prevent this, it is effective to gradually relax the limitation of the engine torque over a predetermined time after the brake pedal 43 is released.

However, a driver who enjoys sports driving may instantaneously depress the brake pedal 43 with the left foot while depressing the accelerator pedal 6 with the right foot to improve turning performance of the vehicle such as at the time of cornering. Further, the brake pedal 43 may be instantaneously depressed with the left foot while the accelerator pedal 6 is depressed with the right foot also when a fine speed adjustment is necessary. Further, it is also conceivable to inadvertently depress the brake pedal 43 with the left foot.

In such a case, the driver wants to accelerate the vehicle after releasing the brake pedal 43, but a requested engine torque may not be able to be obtained until the predetermined time elapses if the limitation of the engine torque is gradually relaxed over the predetermined time after the brake pedal 43 is released. As a result, an acceleration failure occurs and driving performance is rather deteriorated.

Accordingly, in this embodiment, a time until the limitation of the engine torque is completely lifted (hereinafter, referred to as a "limitation lifting time") is changed according to a time during which the brake pedal 43 is depressed (hereinafter, referred to as a "brake operation time"). Specifically, the shorter the brake operation time, the shorter the limitation lifting time. An engine torque control according to this embodiment is described below.

Figure 3:
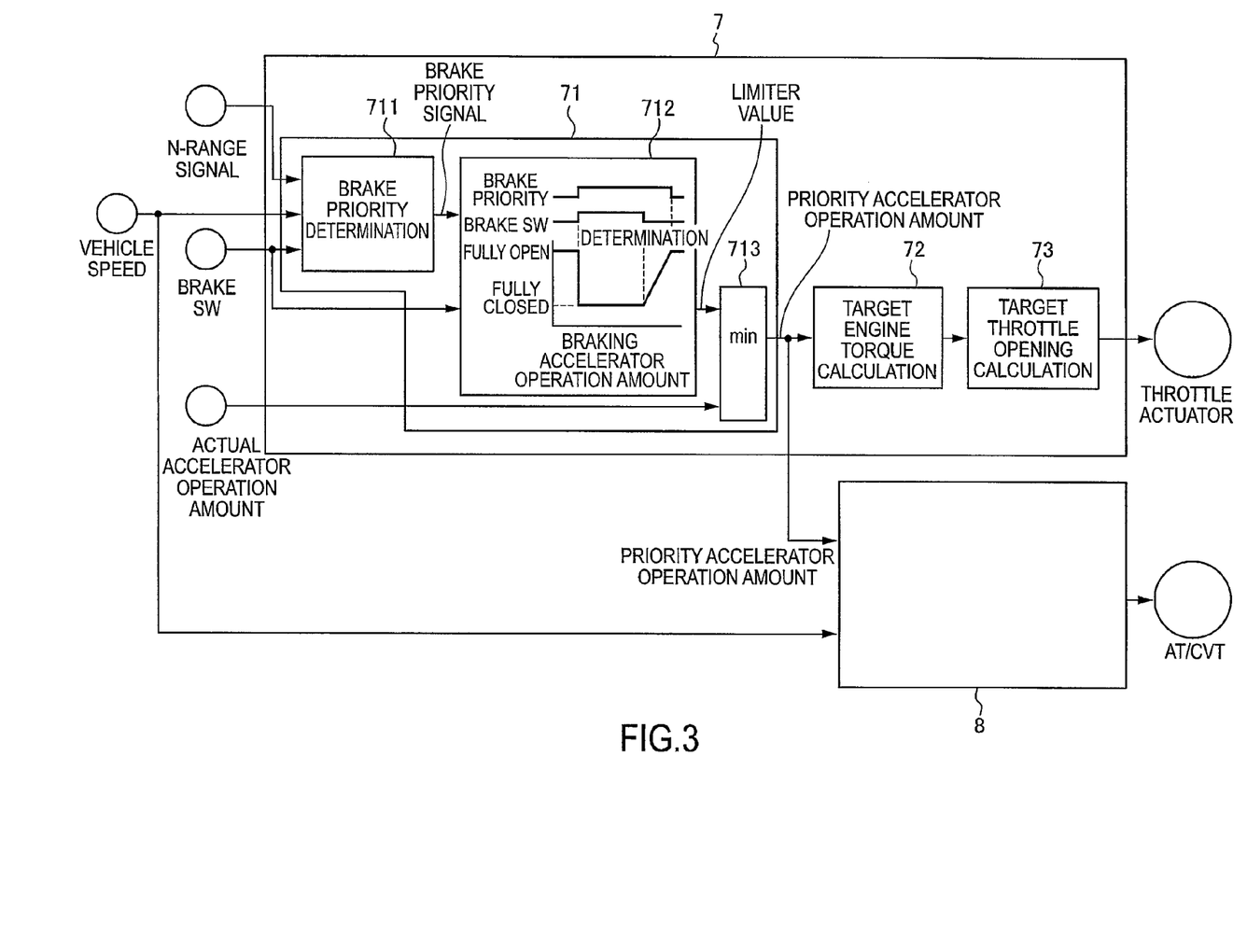
FIG. 3 is a block diagram showing an engine torque control according to the first embodiment of the present invention.

FIG. 3 is a block diagram showing the engine torque control according to this embodiment.

As shown in FIG. 3, an engine torque control unit 7 includes a brake priority control unit 71, a target engine torque calculation unit 72 and a target throttle opening calculation unit 73. The engine torque control unit 7 calculates a target engine torque based on a priority accelerator operation amount output from the brake priority control unit 71, and controls the throttle valve to have a target throttle opening which realizes that target engine torque.

The brake priority control unit 71 includes a brake priority determination unit 711, a limiter value output unit 712 and a priority accelerator operation amount output unit 713 and outputs the priority accelerator operation amount. More detailed processing contents of the brake priority control unit 71 are described later with reference to FIG. 4.

An N-range signal output from the shift position detection sensor 54, a vehicle speed and a brake switch signal are input to the brake priority determination unit 711. The brake priority determination unit 711 determines whether or not to provide an upper limit to the priority accelerator operation amount based on these input signals and outputs a brake priority signal which is switched on when the upper limit is provided.

The brake priority signal and the brake switch signal are input to the limiter value output unit 712. The limiter value output unit 712 outputs an accelerator operation amount when the accelerator pedal 6 is depressed to the end (hereinafter, referred to as a "maximum accelerator operation amount") as a limiter value if the brake priority signal is off.

On the other hand, if the brake priority signal is on, a predetermined accelerator operation amount, with which the vehicle can be decelerated if a braking force by the disc brakes 42 is applied (hereinafter, referred to as a "braking accelerator operation amount"), is output as a limiter value. Further, if the brake switch signal is switched off when the brake priority signal is on, a predetermined accelerator operation amount between the braking accelerator operation amount and the maximum accelerator operation amount (hereinafter, referred to as a "limitation lifting accelerator operation amount") is output as a limiter value.

An actual accelerator operation amount detected by the accelerator stroke sensor 52 (hereinafter, referred to as an "actual accelerator operation amount") and the limiter value are input to the priority accelerator operation amount output unit 713. The priority accelerator operation amount output unit 713 compares the actual accelerator operation amount and the limiter value and outputs the one having a smaller value as the priority accelerator operation amount.

In this way, the brake priority control unit 71 outputs the priority accelerator operation amount whose upper limit is restricted if the brake priority signal is on. On the other hand, if the brake priority signal is off, the actual accelerator operation amount is output as the priority accelerator operation amount without restricting the upper limit of the priority accelerator operation amount to be output.

The priority accelerator operation amount is input to the target engine torque calculation unit 72. The target engine torque calculation unit 72 calculates a target engine torque by applying various corrections after the priority accelerator operation amount is converted into an engine torque.

The target engine torque is input to the target throttle opening calculation unit 73. The target throttle opening calculation unit 73 calculates a target throttle opening based on the target engine torque.

The throttle actuator 27 is so controlled that the throttle opening becomes the target throttle opening.

Further, the priority accelerator operation amount is input to a shift control unit 8 and a gear position of a transmission is shifted based on the priority accelerator operation amount and the vehicle speed.

Next, specific processing contents of the brake priority control unit 71 are described in more detail with reference to FIG. 4.

Figure 4:
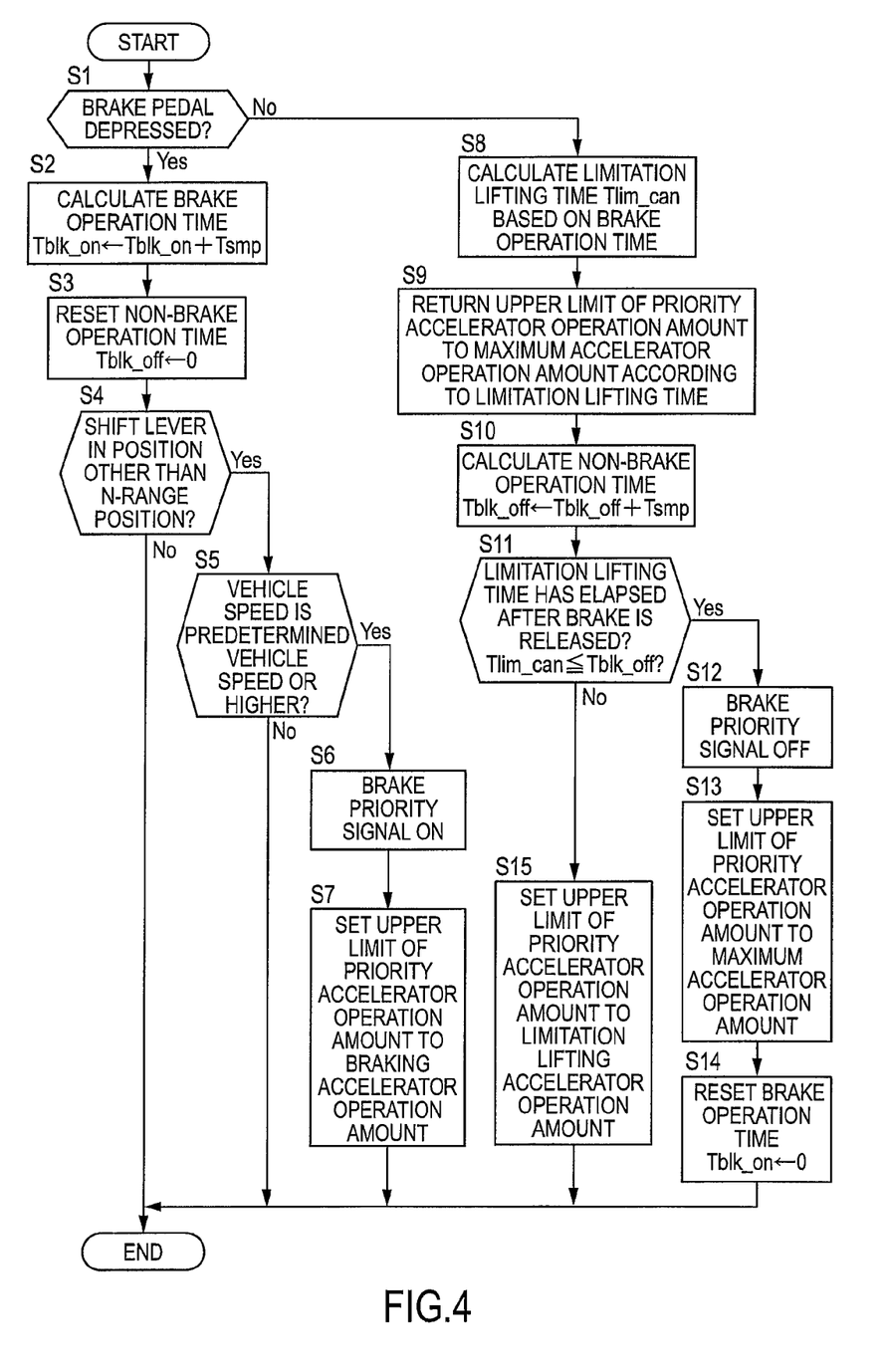
FIG. 4 is a flow chart showing processing contents of a brake priority control unit according to the first embodiment of the present invention.

FIG. 4 is a flow chart showing processing contents of the brake priority control unit 71. The controller 5 repeatedly executes this routine in a predetermined computing cycle Tsmp (e.g. 10 ms).

In Step S1, the controller 5 determines whether or not the brake pedal 43 is depressed. Specifically, whether or not the brake switch signal is on is determined. The controller 5 transfers the process to Step S2 if the brake switch signal is on. On the other hand, the process is transferred to Step S8 if the brake pedal 43 is not depressed and the brake switch signal is kept off.

Steps S2 to S7 are processing performed when the brake pedal 43 is depressed.

In Step S2, the controller 5 calculates a time Tblk_on after the brake pedal 43 is depressed (hereinafter, referred to as a "brake operation time"). Specifically, the value of the brake operation time Tblk_on is updated by adding the computing cycle Tsmp to the last brake operation time Tblk_on.

In Step S3, the controller 5 resets an elapsed time after the brake pedal 43 is released (hereinafter, referred to as a "non-brake operation time") to an initial value of zero.

In Steps S4 and S5, the controller 5 determines whether or not conditions to switch the brake priority signal on when the brake pedal 43 is depressed hold.

In Step S4, the controller 5 determines whether or not the shift lever is located in a position other than an N-range position. Specifically, whether or not an N-range signal is on is determined. This is because it is not necessary to limit the engine torque if the shift lever is in the N-range position since power of the engine 1 is not transmitted to a drive system. The controller 5 transfers the process to Step S5 if the N-range signal is off. On the other hand, the process this time is finished if the N-range signal is on.

In Step S5, the controller 5 determines whether or not the vehicle speed is a predetermined vehicle speed (e.g. 4 km/h) or higher. The controller 5 transfers the process to Step S6 if the vehicle speed is the predetermined vehicle speed or higher. On the other hand, the process this time is finished if the vehicle speed is below the predetermined vehicle speed.

In Step S6, the controller 5 switches the brake priority signal on.

In Step S7, the controller 5 sets the upper limit of the priority accelerator operation amount to the braking accelerator operation amount.

Steps S8 to S14 are processing performed when the brake pedal 43 is released.

Figure 5:
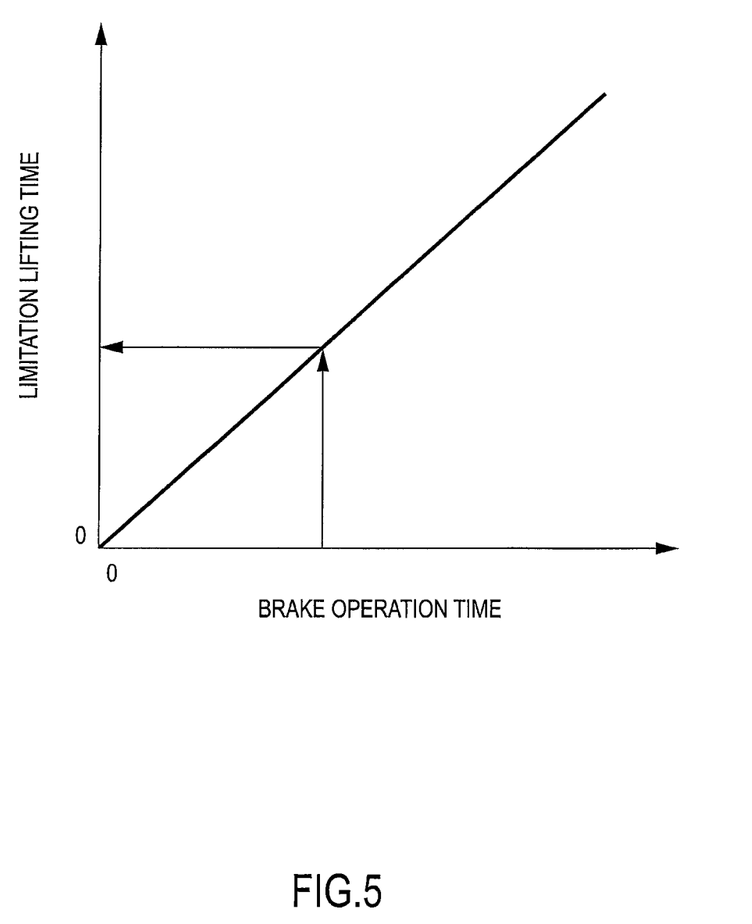
FIG. 5 is a table for calculating a limitation lifting time based on a brake operation time according to the first embodiment of the present invention.

In Step S8, the controller 5 calculates a limitation lifting time Tlim_can based on the brake operation time Tblk_on with reference to a table of FIG. 5. The limitation lifting time Tlim_can is a time until the limitation of the engine torque is completely lifted as described above, i.e. a time until the upper limit of the priority accelerator operation amount is returned from the braking accelerator operation amount to the maximum accelerator operation amount.

In Step S9, the controller 5 calculates a non-brake operation time Tblk_off. Specifically, the value of the non-brake operation time Tblk_off is updated by adding the computing cycle Tsmp to the last non-brake operation time Tblk_off.

In Step S10, the controller 5 gradually returns the upper limit of the priority accelerator operation amount from the braking accelerator operation amount to the maximum accelerator operation amount so that the upper limit of the priority accelerator operation amount is the maximum accelerator operation amount upon the elapse of the limitation lifting time Tlim_can after the brake pedal 43 is released. Specifically, the controller 5 sets the limitation lifting accelerator operation amount based on the limitation lifting time Tlim_can and the non-brake operation time Tblk_off.

In Step S11, the controller 5 determines whether or not the non-brake operation time Tblk_off has become equal to or longer than the limitation lifting time Tlim_can to determine whether or not the limitation lifting time Tlim_can has elapsed after the brake pedal 43 is released. The controller 5 transfers the process to Step S12 if the non-brake operation time Tblk_off has become equal to or longer than the limitation lifting time Tlim_can while transferring the process to Step S15 unless otherwise.

In Step S12, the controller 5 switches the brake priority signal off.

In Step S13, the controller 5 sets the upper limit of the priority accelerator operation amount to the maximum accelerator operation amount.

In Step S14, the controller 5 resets the brake operation time Tblk_on to an initial value of zero.

In Step S15, the controller 5 sets the limitation lifting accelerator operation amount as the upper limit of the priority accelerator operation amount.

FIG. 5 is a table for calculating the limitation lifting time Tlim_can based on the brake operation time Tblk_on.

As shown in FIG. 5, the limitation lifting time Tlim_can is zero when the brake operation time Tblk_on is 0, and increases in proportion to the brake operation time Tblk_on as the brake operation time Tblk_on increases.

Figure 6:
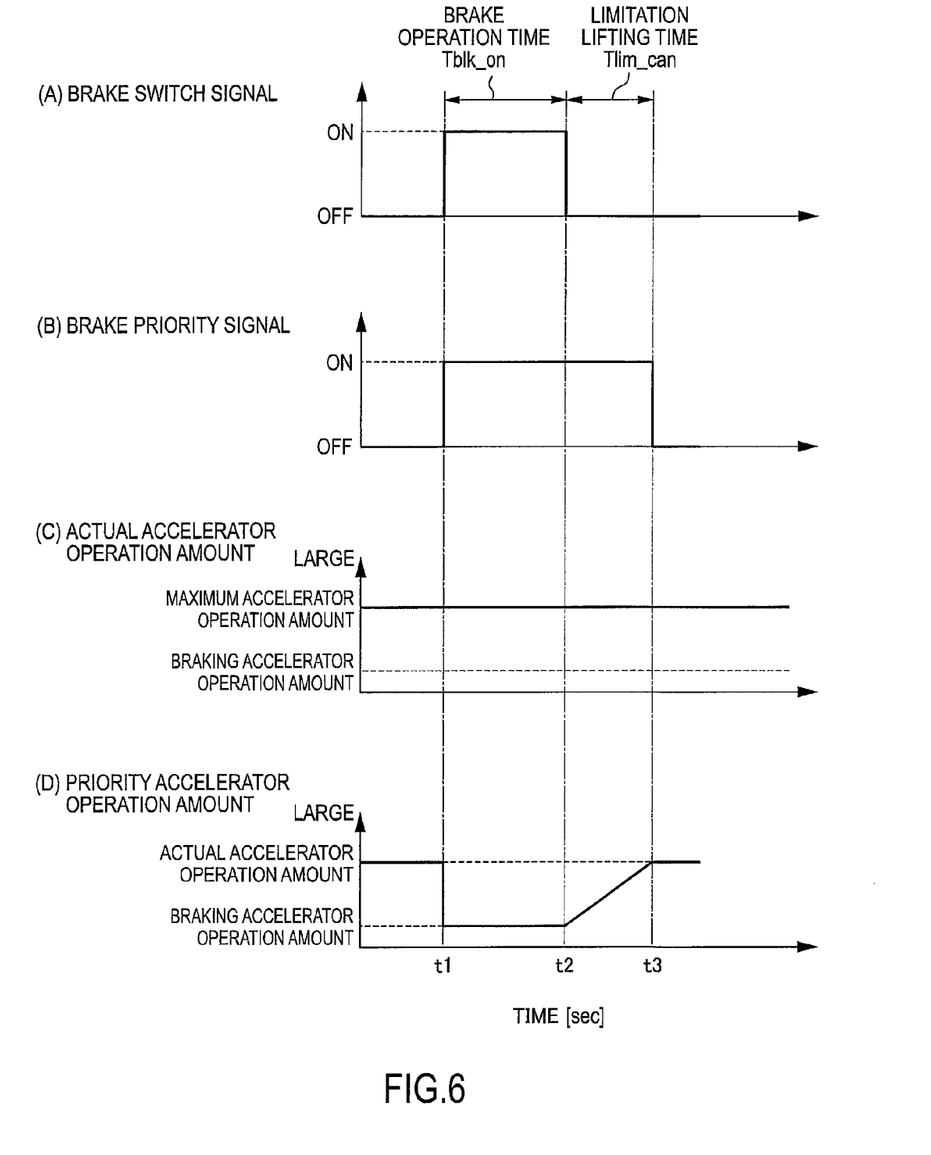
FIG. 6 is a time chart showing processing operations of the brake priority control unit according to the first embodiment of the present invention.

FIG. 6 is a time chart showing processing operations of the brake priority control unit 71. Note that it is assumed that the N-range signal is off and the vehicle speed is the predetermined vehicle speed or higher. To clarify a correspondence with the flow chart, Step numbers of the flow chart are also written.

When the brake pedal 43 is depressed and the brake switch signal is switched on at time t1 (FIG. 6(A); Yes in S1), the brake priority signal is switched on since the N-range signal is off and the vehicle speed is the predetermined vehicle speed or higher (FIG. 6(B); Yes in S4 and S5, S6).

When the brake priority signal is switched on, the upper limit of the priority accelerator operation amount is restricted to the braking accelerator operation amount. Here, since the actual accelerator operation amount is larger than the braking accelerator operation amount, the braking accelerator operation amount is used as the priority accelerator operation amount (FIG. 6(C), (D); S7). As a result, the target engine torque is calculated based on the priority accelerator operation amount whose upper limit is restricted to the braking accelerator operation amount until time t2 at which the brake pedal 43 is released.

If the accelerator pedal 6 and the brake pedal 43 are both depressed when predetermined conditions are met (N-range signal off, predetermined vehicle speed or higher) in this way, the engine torque is controlled to be the target engine torque (braking output) calculated based on the braking accelerator operation amount if the actual accelerator operation amount is larger than the braking accelerator operation amount.

This enables the vehicle to be reliably decelerated and stopped if the brake pedal 43 is depressed even if a state where the accelerator pedal 6 cannot be returned occurs by any chance.

When the brake pedal 43 is released and the brake switch signal is switched off at time t2 (FIG. 6(A); No in S1), the limitation lifting time Tlim_can is calculated based on the brake operation time Tblk_on from time t1 to time t2 (S8).

After time t2, the upper limit of the priority accelerator operation amount is gradually returned from the braking accelerator operation amount to the maximum accelerator operation amount so that the upper limit of the priority accelerator operation amount is the maximum accelerator operation amount at time t3 reached upon the elapse of the limitation lifting time Tlim_can (FIG. 6(D); S10, No in S11, 15). That is, the upper limit of the priority accelerator operation amount is restricted to the limitation lifting accelerator operation amount.

At this time, the limitation lifting time Tlim_can is set to be shorter as the brake operation time Tblk_on becomes shorter. Thus, if a driver instantaneously depresses the brake pedal 43, the upper limit of the priority accelerator operation amount is relatively quickly returned to the maximum accelerator operation amount. As a result, the target engine torque is calculated based on the actual accelerator operation amount immediately after the brake pedal 43 is released, wherefore an engine torque requested by the driver is obtained. This can suppress an acceleration failure and the deterioration of driving performance.

Further, when the brake pedal 43 is depressed for a long time, i.e. when the driver wants to decelerate the vehicle, the upper limit of the priority accelerator operation amount is slowly returned to the maximum accelerator operation amount. This prevents the occurrence of a torque shock due to a sudden increase in the engine torque and also prevents sudden acceleration when the brake pedal 43 is released. Therefore, the deterioration of driving performance can be suppressed and the safety of the driver can be ensured.

When the limitation lifting time Tlim_can elapses at time t3 (Yes in S11), the brake priority signal is switched off (FIG. 6(B); S12), the upper limit of the priority accelerator operation amount is set to the maximum accelerator operation amount and the actual accelerator operation amount is used as the priority accelerator operation amount (FIG. 6(D); S13).

According to this embodiment described above, the brake priority signal is switched on if the brake pedal 43 is depressed and the brake switch signal is switched on when the predetermined conditions are met (N-range signal off, predetermined vehicle speed or higher). Until the brake switch signal is switched off next after the brake priority signal is switched on, the target engine torque (braking output) is calculated based on the braking accelerator operation amount if the actual accelerator operation amount is larger than the braking accelerator operation amount. Then, the engine torque is controlled to be the calculated target engine torque.

This enables the vehicle to be reliably decelerated and stopped if the brake pedal 43 is depressed even if a state where the accelerator pedal 6 cannot be returned occurs by any chance.

If the brake switch signal is switched off when the brake priority signal is on, the limitation lifting time Tlim_can is calculated based on the brake operation time Tblk_on until the brake switch signal is switched off after being switched on. Then, the upper limit of the priority accelerator operation amount is gradually returned from the braking accelerator operation amount to the maximum accelerator operation amount so that the upper limit of the priority accelerator operation amount is the maximum accelerator operation amount when the limitation lifting time Tlim_can elapses after the brake switch signal is switched off.

At this time, the limitation lifting time Tlim_can is set to be shorter as the brake operation time Tblk_on becomes shorter. Thus, if the driver instantaneously depresses the brake pedal 43, the upper limit of the priority accelerator operation amount is relatively quickly returned to the maximum accelerator operation amount. As a result, the target engine torque is calculated based on the actual accelerator operation amount immediately after the brake pedal 43 is released, wherefore an engine torque requested by the driver is obtained. This can suppress an acceleration failure and the deterioration of driving performance.

Further, when the brake pedal 43 is depressed for a long time, i.e. when the driver wants to decelerate the vehicle, the upper limit of the priority accelerator operation amount is slowly returned to the maximum accelerator operation amount. This prevents the occurrence of a torque shock due to a sudden increase in the engine torque and also prevents sudden acceleration when the brake pedal 43 is released. Therefore, the deterioration of driving performance can be suppressed and the safety of the driver can be ensured.

Further, since the throttle opening does not exceed a predetermined opening by restricting the upper limit of the priority accelerator operation amount, a negative pressure can be maintained in the intake air collector 26. Thus, an assisting force in operating the brake pedal 43 by the brake booster 40 can be ensured. Since this enables the master cylinder 41 to generate a sufficient hydraulic pressure when the brake pedal 43 is depressed and enables the brake pads 426 to be firmly pressed against the disc rotors 421, an original braking force of the brake can be generated.

Further, when the shift lever is in the N-range position, the brake priority signal is not switched on.

In this way, the engine torque as requested by the driver corresponding to the actual accelerator operation amount is obtained when the shift lever is in the N-range position and the engine torque is not transmitted to the drive system. Thus, even if the brake pedal 43 is depressed when the engine 1 is raced, the engine rotation speed can be smoothly increased.

Also when the vehicle speed is, for example, in a low vehicle speed range below 4 km/h, the brake priority signal is not switched on. This takes into account that the speed is frequently finely adjusted in the low vehicle speed range.

Since the engine torque as requested by the driver corresponding to the actual accelerator operation amount is obtained in the low vehicle speed range in this way, it becomes easier to finely adjust the speed in the low vehicle speed range while the brake pedal 43 is depressed.

Further, after being switched on, the brake priority signal is not returned to the off-state even if the position of the shift lever is changed to the N-range position or the vehicle speed enters the low vehicle speed range.

This prevents the brake priority signal from being switched off even if the vehicle speed enters the low vehicle speed range when the upper limit of the priority accelerator operation amount is restricted to the braking accelerator operation amount. Thus, the vehicle can be prevented from accelerating again. Further, since the brake priority signal is not switched off even if the position of the shift lever is changed to the N-range position, useless racing of the engine 1 can be prevented.

Further, in this embodiment, the gear position of the transmission is shifted based on the priority accelerator operation amount and the vehicle speed. When the priority accelerator operation amount is limited to the braking accelerator operation amount, this is the same state as the state where the accelerator pedal 6 is returned, wherefore upshifting is basically performed. Thus, the vehicle can be more easily decelerated since the drive force of the vehicle can be reduced.

(Second Embodiment)

Next, an engine torque control according to a second embodiment of the present invention is described. The engine torque control according to this embodiment differs from the first embodiment in that the upper limit of the accelerator operation amount is immediately set to the maximum accelerator operation amount even within the limitation lifting time when the accelerator operation amount becomes zero. The following description is centered on that point of difference. Note that, in the following embodiment, parts having the same functions as in the first embodiment described above are not repeatedly described as appropriate by using the same reference signs.

Figure 7:
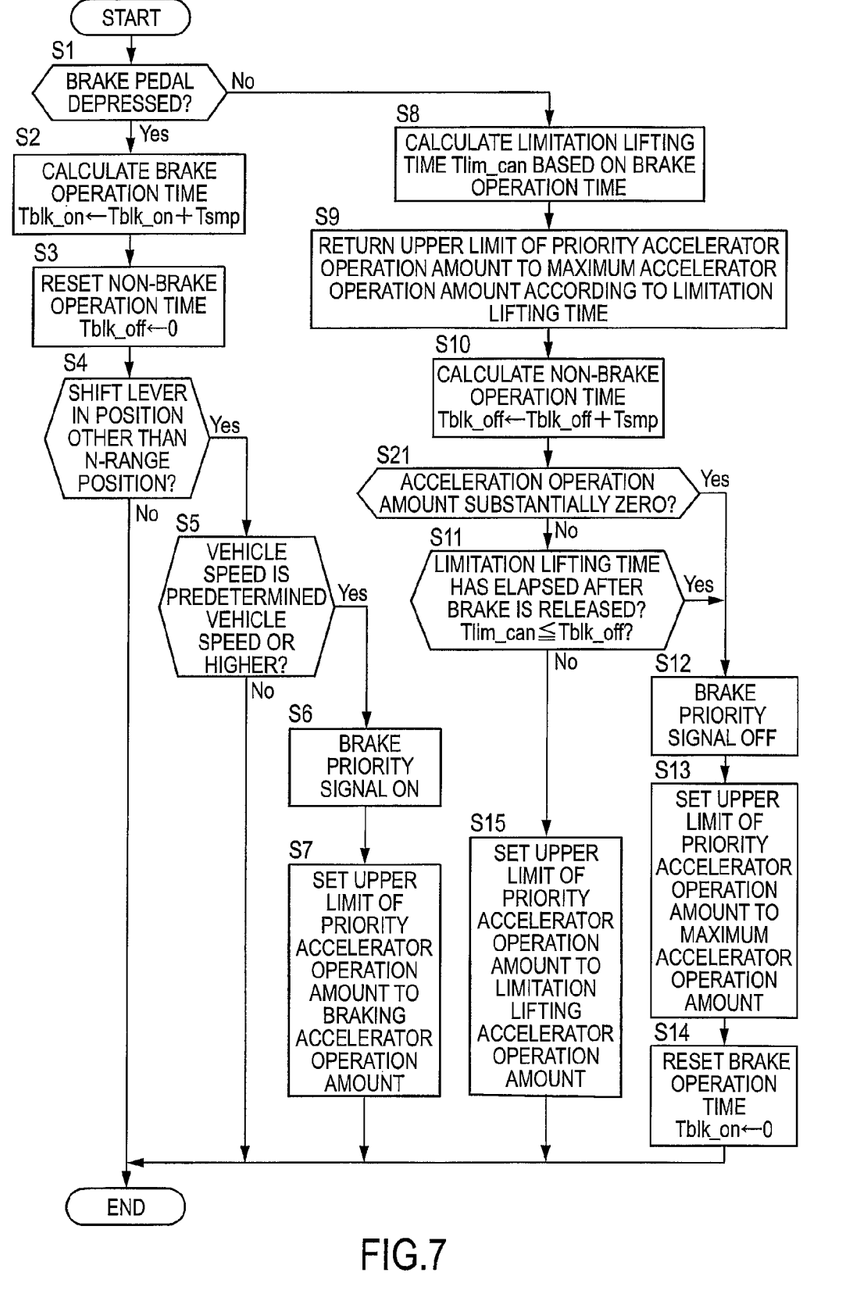
FIG. 7 is a flow chart showing processing contents of a brake priority control unit according to a second embodiment of the present invention.

FIG. 7 is a flow chart showing processing contents of a brake priority control unit 71 according to this embodiment.

In Step S21, the controller 5 determines whether or not the actual accelerator operation amount is substantially zero. The controller 5 transfers the process to Step S12 if the actual accelerator operation amount is substantially zero while transferring the process to Step S11 unless otherwise. The brake priority signal is immediately switched off if the actual accelerator operation amount is substantially zero even before the limitation lifting time Tlim_can elapses because it can be judged that there is no trouble with the accelerator pedal 43 and the upper limit of the priority accelerator operation amount needs not be restricted if the actual accelerator operation amount is substantially zero.

Figure 8:
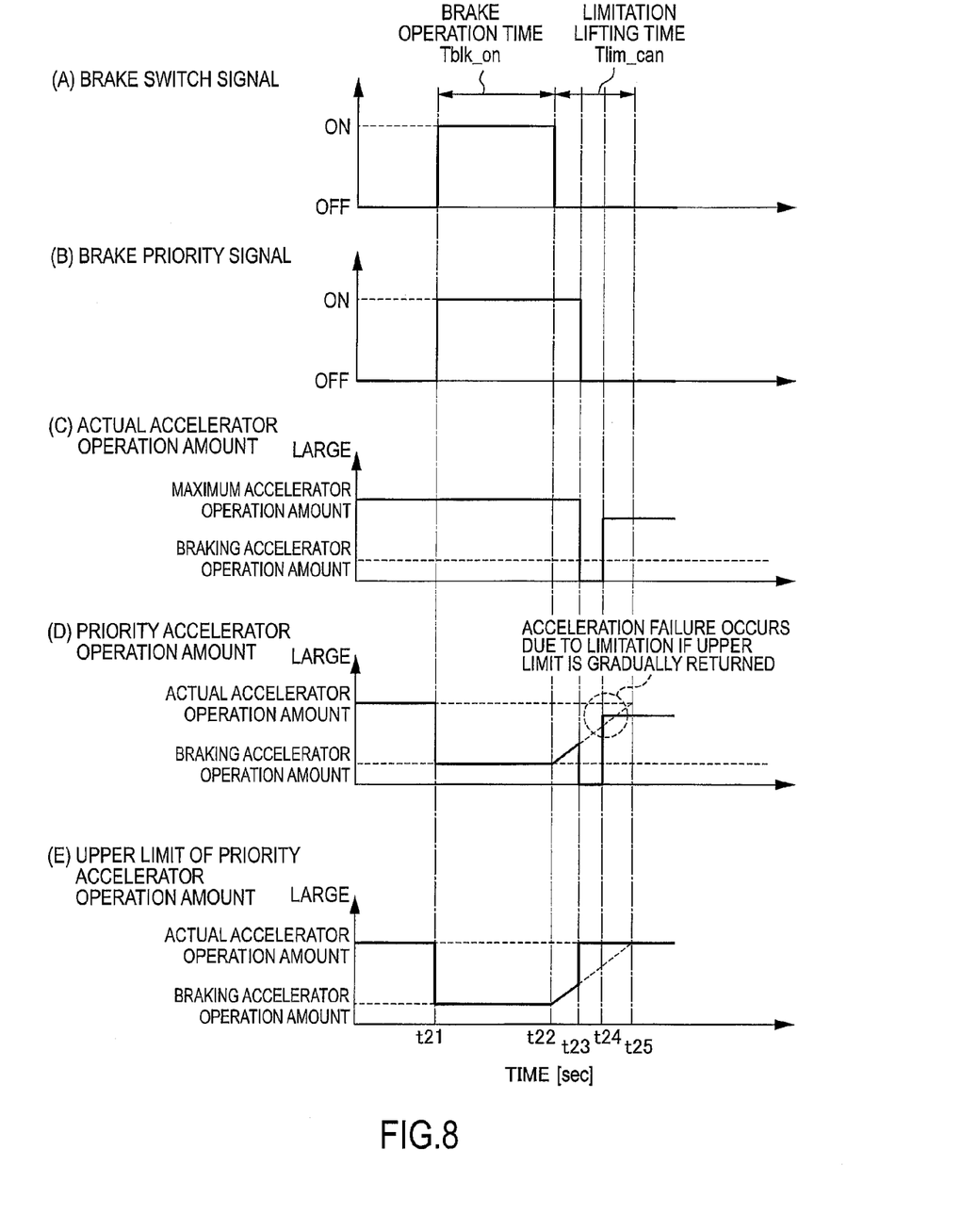
FIG. 8 is a time chart showing processing operations of the brake priority control unit according to the second embodiment of the present invention.

FIG. 8 is a time chart showing processing operations of the brake priority control unit 71 according to this embodiment. Note that it is assumed that an N-range signal is off and a vehicle speed is a predetermined vehicle speed or higher. Further, to clarify a correspondence with the flow chart, Step numbers of the flow chart are also written.

When the brake pedal 43 is depressed and the brake switch signal is switched on at time t21 (FIG. 8(A); Yes in 51), the brake priority signal is switched on (FIG. 8(B); Yes in S4 and S5, S6) since the N-range signal is off and the vehicle speed is the predetermined vehicle speed or higher. As a result, the upper limit of the priority accelerator operation amount is restricted to the braking accelerator operation amount (FIG. 8(E); S7).

When the brake pedal 43 is released and the brake switch signal is switched off at time t22 (FIG. 8(A); No in S1), the limitation lifting time Tlim_can is calculated based on the brake operation time Tblk_on from time t21 to time t22 (S8).

After time t22, the upper limit of the priority accelerator operation amount is gradually returned from the braking accelerator operation amount to the maximum accelerator operation amount so that the upper limit of the priority accelerator operation amount is the maximum accelerator operation amount at time t25 reached upon the elapse of the limitation lifting time Tlim_can (FIG. 8(D); S10, No in S21, No in S11, S15). That is, the upper limit of the priority accelerator operation amount is restricted to the limitation lifting accelerator operation amount.

However, here, the accelerator operation amount becomes zero at time t23 before the limitation lifting time Tlim_can elapses (FIG. 8(C)). Thus, it is judged that there is no trouble with the accelerator pedal 43 and the brake priority signal is switched off (FIG. ((B); Yes in S21, S12). As a result, at time t23, the upper limit of the priority accelerator operation amount is returned to the maximum accelerator operation amount at once (FIG. 8(E); S13).

Here, the following problem occurs if the upper limit of the priority accelerator operation amount is gradually returned from the braking accelerator operation amount to the maximum accelerator operation amount even if the accelerator operation amount becomes zero and the accelerator pedal 6 returns to its normal state.

That is, if the accelerator pedal 6 is depressed beyond the upper limit of the priority accelerator operation amount by the intention of the driver at time t24 before the limitation lifting time Tlim_can elapses because the accelerator pedal 6 has returned to its normal state, an output engine torque is lower than an engine torque requested by the driver (FIG. 8(D)). Thus, an acceleration failure occurs and driving performance is deteriorated.

Accordingly, if the accelerator operation amount becomes zero and the accelerator pedal 6 returns to its normal state, an engine torque requested by the driver can be output when the accelerator pedal 43 is depressed by the intention of the driver at time t24 by returning the upper limit of the priority accelerator operation amount to the maximum accelerator operation amount at once as in this embodiment (FIG. 8(D)). Since this prevents the occurrence of an acceleration failure, the deterioration of driving performance can be suppressed.

According to this embodiment described above, even before the limitation lifting time Tlim_can elapses, the brake priority signal is immediately switched off and the upper limit of the priority accelerator operation amount is immediately returned to the maximum accelerator operation amount if the accelerator pedal 6 has returned to its normal state.

Thus, after the accelerator pedal 6 returns to its normal state, the upper limit of the priority accelerator operation amount is not restricted even before the limitation lifting time Tlim_can elapses and the target engine torque can be calculated based on the actual accelerator operation amount. Therefore, the occurrence of an acceleration failure can be suppressed and driving performance can be improved.

Although this invention has been described by way of the specific embodiments, this invention is not limited to the above embodiments. It is possible for a person skilled in the art to modify or alter the above embodiments in various manners within the technical scope of the present invention.

For example, although the above embodiments have been described, taking the spark ignition internal combustion engine as an example, there is no limitation to this and, for example, a compression ignition internal combustion engine may be adopted. In that case, the engine torque may be controlled by controlling a fuel injection amount instead of the throttle opening.

Further, although the description has been made, taking the disc brakes 42 as an example, there is no limitation to this and, for example, drum brakes may be adopted.

Further, although the throttle opening is controlled when the engine torque is controlled to the target engine torque, there is no limitation to this. For example, in the case of including a variable valve device capable of continuously changing lift/operating angles of the intake valves 123, the engine torque may be controlled by controlling lift amounts of the intake valves 123 by that variable valve device. Further, the fuel injection amount may also be reduced.

Further, although the upper limit of the priority accelerator operation amount is gradually returned from the braking accelerator operation amount to the maximum accelerator operation amount over the predetermined limitation lifting time when a braking request operation is finished, there is not limitation to this. For example, when the braking request operation is finished, the upper limit of the priority accelerator operation amount is gradually returned from the braking accelerator operation amount to the maximum accelerator operation amount according to a predetermined driving distance. Further, the limitation lifting time may also be set according to a driving distance at the time of a brake operation.

Although whether or not the upper limit is provided for the priority accelerator operation amount is determined based on the N-range signal, the vehicle speed and the brake switch signal, it may be determined only based on the brake switch signal.

For the above description, the contents of Japanese Patent Application No. 2010-92177 filed on Apr. 13, 2010 are hereby incorporated by reference.

The invention claimed is:

1. An output control device for an internal combustion engine for generating a drive force of a vehicle, comprising:
   a braking request detection sensor for detecting whether or not a braking request operation has been performed; and
   a controller programmed to:
      limit an output of the internal combustion engine when the braking request operation is started; and
      completely lift output limitation of the internal combustion engine over a predetermined limitation lifting time when the braking request operation is finished and shorten the limitation lifting time when a predetermined condition holds.

2. The output control device for the internal combustion engine according to claim 1, wherein the controller is further programmed to calculate a braking operation time from the start of the braking request operation and shorten the limitation lifting time more as the braking operation time becomes shorter when the braking request operation is finished.

3. The output control device for the internal combustion engine according to claim 1, wherein the controller is further programmed to shorten the limitation lifting time when there is no more request for the drive force.

4. The output control device for the internal combustion engine according to claim 1, wherein the controller is further programmed to limit the output of the internal combustion engine based on a braking accelerator operation amount more limited than a maximum accelerator operation amount which is an accelerator operation amount when an accelerator pedal is depressed to the end and return from the limitation of the output of the internal combustion engine based on the braking accelerator operation amount to the limitation of the output of the internal combustion engine based on the maximum accelerator operation amount over the predetermined limitation lifting time when the braking request operation is finished.

5. An output control method for an internal combustion engine for generating a drive force of a vehicle, comprising:
- detecting whether or not a braking request operation has been performed;
- limiting an output of the internal combustion engine when the braking request operation is started; and
- completely lifting output limitation of the internal combustion engine over a predetermined limitation lifting time when the braking request operation is finished and shortening the limitation lifting time when a predetermined condition holds.

* * * * *